US006493469B1

(12) United States Patent
Taylor et al.

(10) Patent No.: US 6,493,469 B1
(45) Date of Patent: Dec. 10, 2002

(54) DUAL VIDEO CAMERA SYSTEM FOR SCANNING HARDCOPY DOCUMENTS

(75) Inventors: Michael J. Taylor, Guildford (GB); William M. Newman, Cambridge (GB)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/340,748

(22) Filed: Jun. 28, 1999

(51) Int. Cl.[7] .................................................. G06K 9/36
(52) U.S. Cl. ...................... 382/284; 382/294; 382/199; 382/200; 382/154
(58) Field of Search ................................. 382/284, 289, 382/290, 296, 294, 199, 200, 154; 358/450

(56) References Cited

U.S. PATENT DOCUMENTS

| | | | | |
|---|---|---|---|---|
| 5,084,611 A | * | 1/1992 | Okisu et al. ................. | 250/208 |
| 5,511,148 A | * | 4/1996 | Wellner ...................... | 395/106 |
| 5,528,290 A | | 6/1996 | Saund ........................ | 348/218 |
| 5,581,637 A | * | 12/1996 | Cass et al. .................. | 382/284 |
| 5,835,241 A | * | 11/1998 | Saund ........................ | 358/488 |
| 6,205,259 B1 | * | 3/2001 | Komiya et al. ............. | 382/284 |
| 6,304,284 B1 | * | 10/2001 | Dunton et al. .............. | 348/36 |

OTHER PUBLICATIONS

U.S. patent application Ser. No. 09/081,269, entitled "Method and Apparatus For Enhancing And Thresholding Images," to Taylor et al., filed May 19, 1998.
U.S. patent application Ser. No. 09/081,266 entitled "Method and Apparatus for Selecting Text And Image Data From Video Images," to Taylor et al., filed May 19, 1998.

* cited by examiner

*Primary Examiner*—Phuoc Tran
*Assistant Examiner*—Ali Bayat

(57) ABSTRACT

A face-up document scanning apparatus stitches views from multiple video cameras together to form a composite image. The document scanning apparatus includes an image acquisition system and a frame merger module. The image acquisition, which is mounted over the surface of a desk on which a hardcopy document is placed, has two video cameras for simultaneously recording two overlapping images of different portions of the hardcopy document. By overlapping a portion of the recorded images, the document scanning apparatus can accommodate hardcopy documents of varying thickness. Once the overlapping images are recorded by the image acquisition system, the frame merger module assembles a composite image by identifying the region of overlap between the overlapping images. The composite image is subsequently transmitted for display on a standalone device or as part of a video conferencing system.

21 Claims, 14 Drawing Sheets

FIG. 5
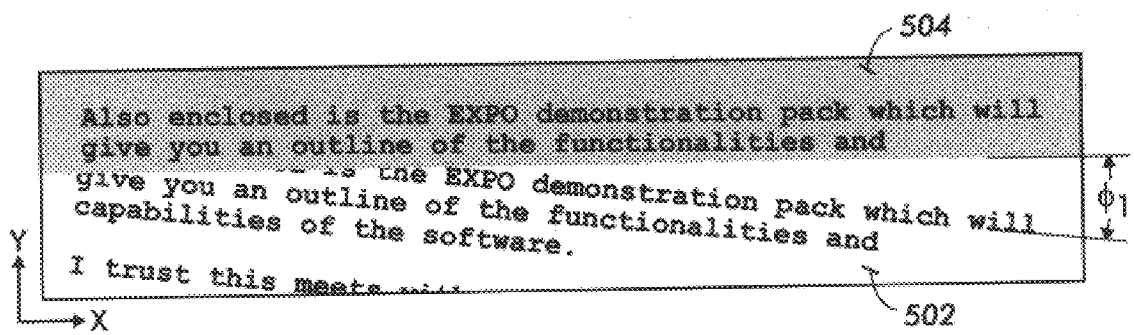
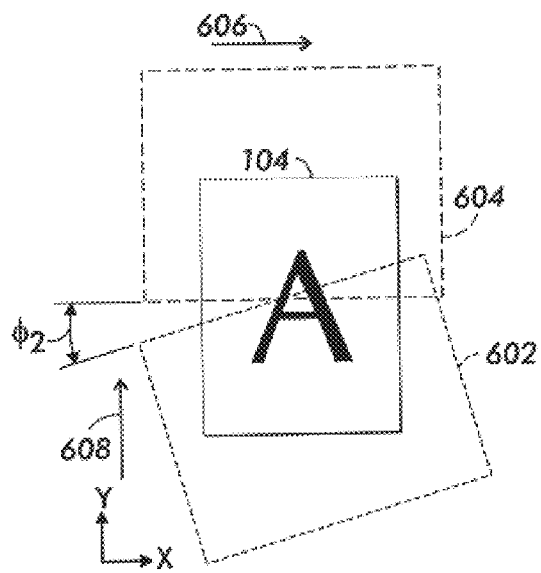
FIG. 6
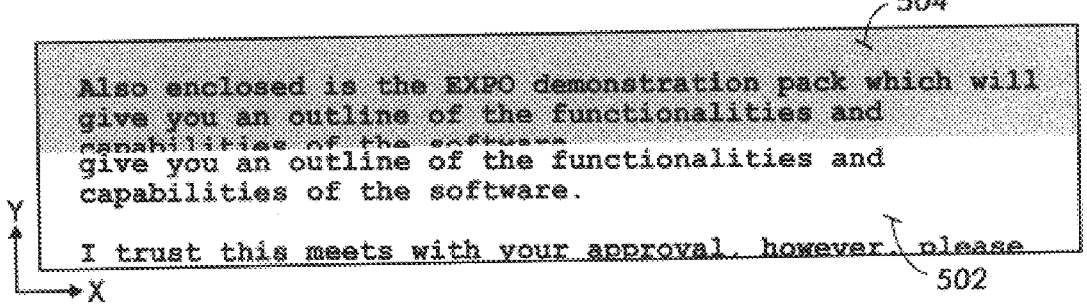
FIG. 7

FIG. 10

Also explored in the SRPD demonstration panel which will give you an outline of the functionalities and capabilities of the software.

FIG. 11 give you an outline of the functionalities and capabilities of the software.

FIG. 12

The method does not indicate where text is upside-down, and it is a document text skew in hardware mode. It assumes that roman characters in all languages and using morphological operations to identify such pixels. Only a statistical determination of orientation, and images without text are

FIG. 13

This method does not indicate when text is upside-down, and it al
of rotation to measure text skew in landscape mode. However, suc
of four directions) by noting that roman characters in all languages
and using morphological operations to identify such pixels. Only a
statistical determination of orientation, and images without text are

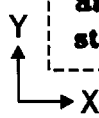

FIG. 14

This method does not indicate when text is upside-down, and it al
of rotation to measure text skew in landscape mode. However, sud
of four directions) by noting that roman characters in all languages
and using morphological operations to identify such pixels. Only a
statistical determination of orientation, and images without text are

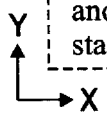

DUAL VIDEO CAMERA SYSTEM FOR SCANNING HARDCOPY DOCUMENTS

BACKGROUND OF THE INVENTION

1. Field of the Invention

The present invention relates generally to an over-the-desk document scanning system, and more particularly to, a method and apparatus for generating a composite image of a hardcopy document using images from multiple video cameras.

2. Description of Related Art

Over-the-desk scanning systems that position a video camera above a desk to capture images of hardcopy document are known. An example of such an over-the-desk scanning system is disclosed by Wellner in U.S. Pat. No. 5,511,148 entitled "Interactive Copying System." In operation, the over-the-desk scanning system captures images of hardcopy documents and digitizes them for further processing. These captured images of hardcopy documents arranged on a desk are subsequently displayed on a computer monitor immediately coupled to the over-the-desk scanning system or remotely coupled via a network that form part of a video conferencing system.

Over-the-desk (i.e., face-up) scanning of hardcopy documents with a video camera has several advantages over traditional face-down scanning techniques. One advantage of face-up scanning is that a hardcopy document can be simultaneously read on a physical desktop and scanned without requiring the hardcopy document to be repositioned in a face down orientation. This advantage provides seamless integration between working hardcopy documents positioned on a physical desktop and the electronic document applications operating on a computer to which the over-the-desk video camera is coupled. Another advantage is that additional elements, such as a pointing finger, can be captured, for example, to annotate the hardcopy document in its corresponding scanned representation during a video conferencing session.

Although the use of video cameras is very effective with video conferencing applications, video cameras do not typically yield images with sufficient quality (i.e., resolution) to enable successful document decoding using OCR (Optical Character Recognition). Never the less, it would be desirable for an over-the-desk document scanning system to record large high resolution images of hardcopy documents. These recorded large high resolution images could then either be broadcast as part of a video conferencing system or be edited for use with or in other electronic documents. Furthermore, in order for such an interactive over-the-desk scanning system to perform effectively, it would be desirable that such a system be adapted to record images of hardcopy documents that have an undetermined thickness. It would therefore be advantageous to provide an over-the-desk document scanning system that is adapted to both efficiently generate large high resolution images using video cameras in a manner that is independent of the thickness of a hardcopy document.

SUMMARY OF THE INVENTION

In accordance the invention, there is provided an apparatus and method therefor, for scanning hardcopy documents. The apparatus includes an image acquisition system and a frame merger module. Initially, the image acquisition system simultaneously records parts of a hardcopy document positioned face-up on a work surface. The parts of the hardcopy document are recorded without perspective distortion in a first image and a second image by the image acquisition system. A portion of each of the parts of the hardcopy document recorded in the first image and the second image record an identical segment of the hardcopy document. Subsequently, the frame merger module forms a composite image of the hardcopy document by stitching the first image and the second image together at the portions in each image that record the identical segment of the hardcopy document. The frame merger module identifies the portion in the first image and the portion in the second image by computing correlation values of high gradient images of the first image and the second image for different regions of overlap between the first image and the second image.

BRIEF DESCRIPTION OF THE DRAWINGS

These and other aspects of the invention will become apparent from the following description read in conjunction with the accompanying drawings wherein the same reference numerals have been applied to like parts and in which:

FIG. 5 illustrates an example of two image segments recorded using a general imaging geometry;

FIG. 6 illustrates a top down view of the hardcopy document shown in FIG. 1 with a first image region recorded in a first image and a second image region recorded in a second image by two different video cameras before the two images are registered rotationally and translationally;

FIG. 7 illustrates an example in which the two image segments shown in FIG. 5 after they are registered rotationally and translationally in the x-direction using the camera mount adjustments shown in FIG. 4;

FIGS. 10 and 11 illustrate high gradient image segments for the image segments that are illustrated in the image segments 504 and 502 that are shown in FIG. 7;

FIG. 12 illustrates an example of a composite image generated after performing the steps shown in the flow diagram in FIG. 9;

FIG. 13 illustrates an example of a composite image that has been adaptively thresholded;

FIG. 14 illustrates an example of an adaptively thresholded image that has been analyzed to identify textual and formatting content.

DETAILED DESCRIPTION

A. Operating Environment

Figure 1:
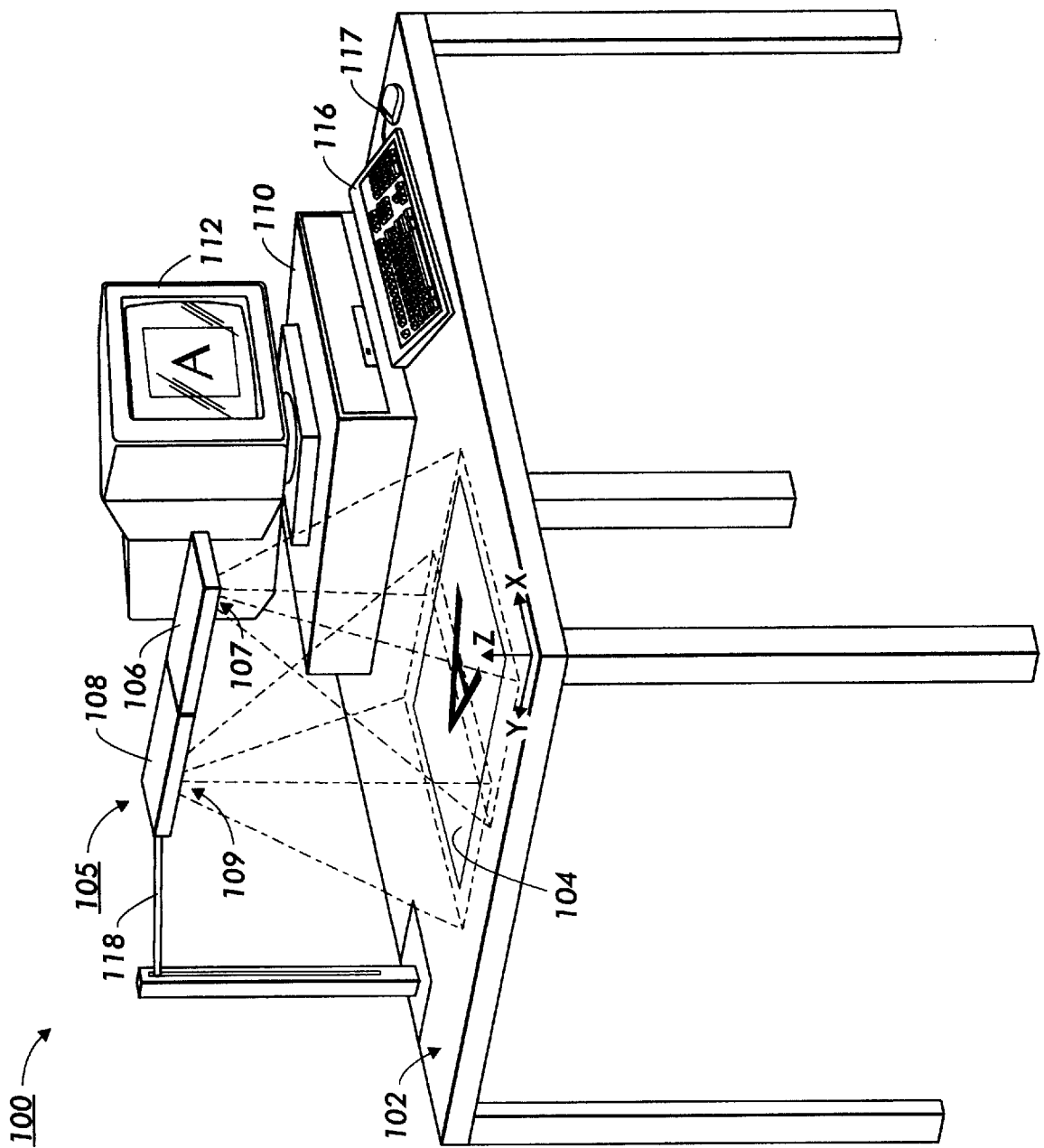
FIG. 1 illustrates an over-the-desk document scanning apparatus for generating a composite image of overlapping video images of a hardcopy document.

FIG. 1 illustrates a document scanning apparatus or arrangement 100 for generating a composite image of recorded video images that partially overlap a portion of different parts of a hardcopy document. The arrangement 100 includes a relatively planar surface 102 onto which a hardcopy document 104 is positioned and recorded by an image acquisition system 105. The surface 102, which may for example form part of a desk, is oriented in the Figures using an X, Y, Z Cartesian coordinate system.

In one embodiment, the image acquisition system 105 includes two video cameras 107 and 109 that are positioned in video camera housings 106 and 108, respectively. The video camera housings 106 and 108 are supported in stationary positions above the surface 102 by a camera mount 118 that is fixedly attached to the surface 102. In accordance with the present invention, the output of the video cameras 107 and 109 is transmitted to a general purpose computer 110 for further processing and viewing on a display 112.

Figure 2:
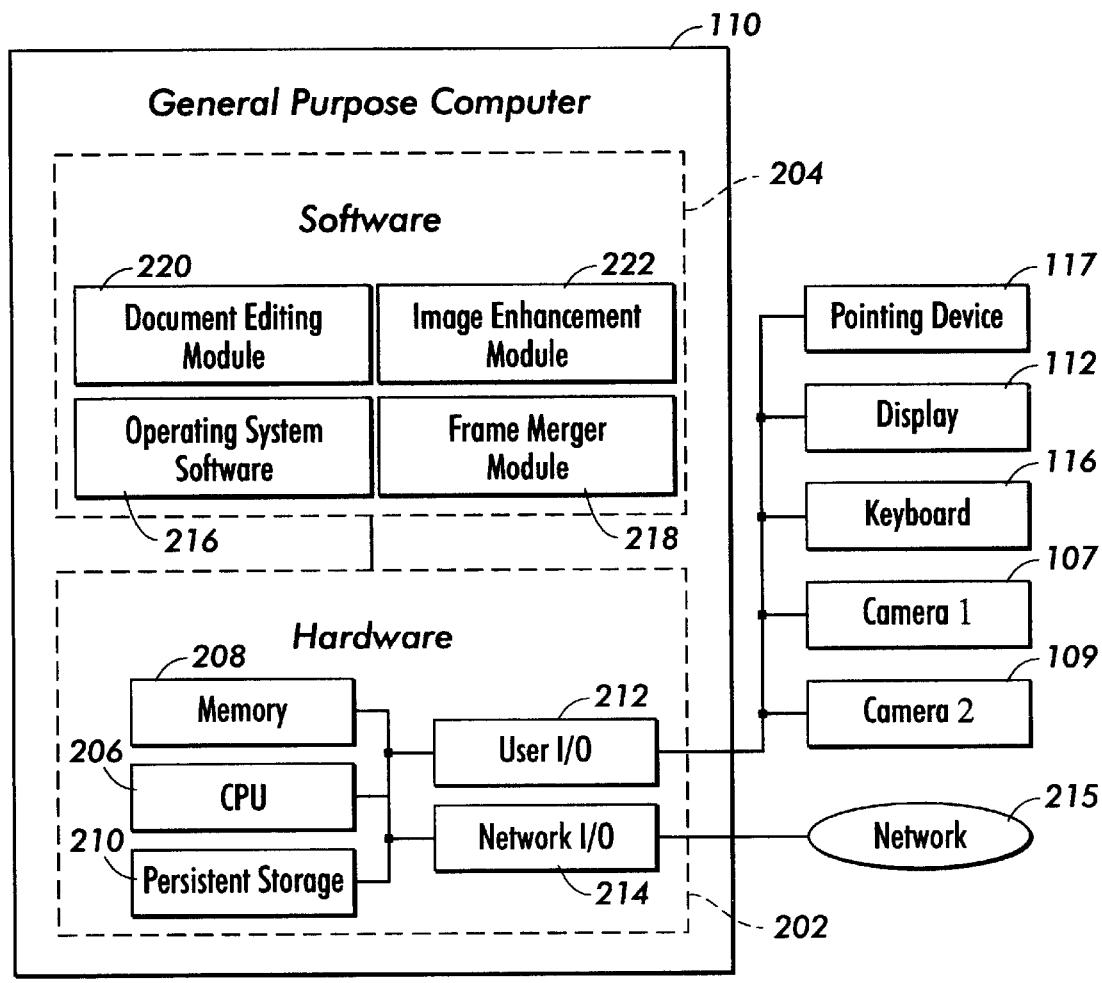
FIG. 2. illustrates a block diagram of a general purpose computer that includes hardware and software components for carrying out the present invention.

The general purpose computer 110, which is shown in one embodiment in FIG. 2, includes hardware components 202 and software modules 204. The hardware components 202 are made up of a processor (i.e., CPU) 206, memory 208 (ROM, RAM, etc.), persistent storage 210 (e.g., CD-ROM, hard drive, floppy drive, tape drive, etc.), user I/O 212, and network I/O 214. The user I/O 212 can include a keyboard 116, a pointing device 117 (e.g., pointing stick, mouse, etc.), the display 112, and video cameras 107 and 109. The network I/O 214 is a communications gateway to a network 215 such as the Internet.

The software modules 204 of the general purpose computer 110 include an operating system 216, a frame merger module 218, a document editing module 220, and an image enhancement module 222. The operating system 216 permits processor 105 to control the various hardware devices such as the cameras 107 and 109, and the display 112. In addition, the frame merger module 218 enables the processor 105 to formulate a composite image of two images simultaneously recorded by the cameras 107 and 109.

As discussed in detail below, the frame merger module 218 is adapted to stitch together two images that are simultaneously recorded by the video cameras 107 and 109 for viewing as a single composite image on the display 112. Subsequently if desired, the composite image generated by the frame merger module 218 can be enhanced or edited by invoking the image enhancement module 222 or the document editing module 220, respectively.

It will be appreciated by those skilled in the art that the general purpose computer 110 can be defined by any one of a plurality of configurations. For instance, the processor 206 may in alternate embodiments be defined by a collection of microprocessors configured for multiprocessing. In yet other embodiments, the functions provided by software modules 204 may be distributed across multiple computers acting together as a single processing unit.

B. Overview of Multi-Camera Document Viewer

The document scanning arrangement 100 is adapted to form a high resolution image of the hardcopy document 104 using low resolution images recorded by the cameras 107 and 109. The high resolution image is formed using multiple low resolution images each of which records different parts of the same hardcopy document. A portion of each of the parts of the hardcopy document recorded in a first image and a second image record an identical segment of the hardcopy document 104. By rapidly identifying the overlapping portions of the parts of the hardcopy document recorded in the images, a composite image of the hardcopy document is formed.

In accordance with one aspect of the invention, multiple video cameras are employed to quickly capture images of the hardcopy document 104 positioned on the surface 102. Because the arrangement 100 is recording and displaying images in real time, forming a composite image of simultaneously recorded images must be efficient. In accordance with another aspect of the invention, the composite image is formed using both physical registration using a multi-camera mount 118 (discussed in detail below in Section B.1) and computational registration using the frame merger module 218 (discussed in detail below in Section B.2). In accordance with yet another aspect of the invention, the camera mount 118, the camera housings 106 and 108, and the frame merger module 218 are adapted to generate a composite image of hardcopy documents that have varying degrees of thickness (in the z-direction).

B.1 Multi-Camera Mount

Figure 3:
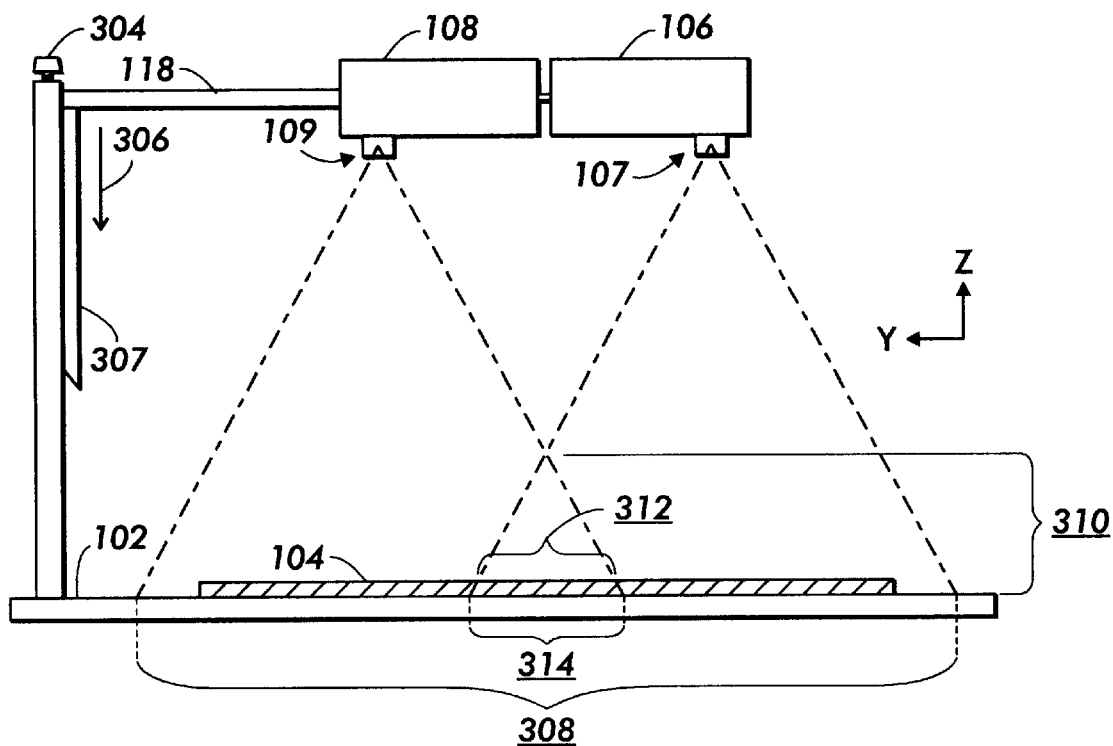
FIG. 3 illustrates a side view of the camera mount shown in FIG. 1.

FIG. 3 illustrates a side view of the camera mount 118 shown in FIG. 1. A screw 304 on camera mount 118 provides a field of view adjustment for the cameras 107 and 109. The field of view adjustment moves cameras 107 and 109 in the vertical direction (i.e., z-direction) along a slider 307 relative to the surface 102 as indicated by arrow 306. Moving the cameras 107 and 109 closer to or further away from the surface 102 decreases or increases, respectively, the field of view and, therefore, the resolution of a composite image of the document 104 recorded by the arrangement 100. In addition, as shown in FIG. 3, the cameras 107 and 109 are arranged with a maximum field of view 308. This maximum field of view 308 in combination with a region of overlap 314 defines a maximum document thickness 310 at which a hardcopy document 104 can be scanned by the arrangement 100. Documents that exceed the maximum document thickness 310 cannot be stitched together by the frame merger module 218 because no region of overlap exists between simultaneously recorded images.

Figure 4:
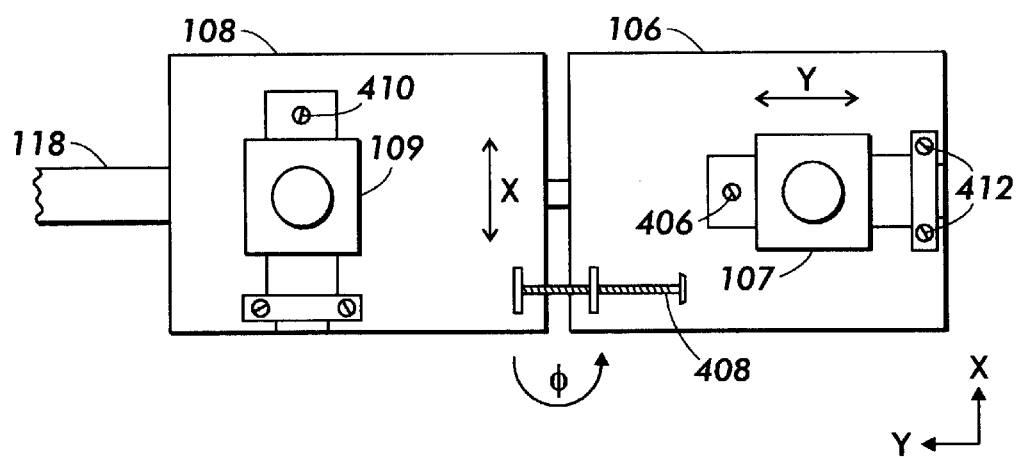
FIG. 4 illustrates a top-down view of the camera housings shown in FIGS. 1 and 2.

FIG. 4 illustrates a detailed top-down view of the camera housings 106 and 108 that are shown in FIGS. 1 and 2. The camera housing 106 includes the video camera 107, a top-to-bottom (i.e., y-direction) adjustment screw 406, an angular (i.e., φ) adjustment screw 408, and height adjustment screws 412. The camera housing 108 includes the video camera 109 and a side-to-side (i.e., x-direction) adjustment screw 410. In one embodiment, the video cameras 107 and 109 are the CCM-DS250 digital video camera, which is sold by Sony Electronics Inc. The adjustments 304, 406, 408, 410, and 412 are used to register the images that are simultaneously recorded by the video cameras 107 and 109 by imposing geometric constraints (i.e., rotational and translational in the x-direction). These geometric constraints simplify the number of operations that the frame merger module 218 must perform to form a composite image of the hardcopy document 104.

More specifically, the cameras 107 and 109 are fixedly positioned in the camera housings 106 and 108, respectively, at an angle that is substantially perpendicular to the x-y plane of the surface 102. This angle simplifies computations performed by the frame merger module by minimizing perspective distortion in the images recorded by the cameras 107 and 109. In addition, the lenses of the cameras 107 and 109 are selected to be substantially identical so that the simultaneously recorded images have the same or similar scale. However, if the simultaneously recorded images are out of scale, the height adjustment screws 412 are used to position the height of one camera relative to the other (i.e., in the z-direction). Advantageously, by minimizing perspective distortion the geometric arrangement of the two cameras 107 and 109 can be defined as purely Euclidean.

FIG. 5 illustrates an example that shows two image segments 502 and 504 from images recorded by the cameras 107 and 109, respectively, when the document scanning apparatus 100 is in a general imaging geometry. More specifically, the example illustrated in FIG. 5 shows alignment of the top-half of a hardcopy document recorded by the image segment 504 and the bottom-half the document recorded by the image segment 502. That is, FIG. 5 illustrates an example of two image segments 502 and 504 recorded by the cameras 107 and 109, respectively, before using the adjustments 406, 408, and 410 shown in FIG. 4 to align the recorded image segments 502 and 504 of the cameras 107 and 109 rotationally by the angle $\phi_1$ and translationally in the x-direction.

FIG. 6 illustrates a top down view of the hardcopy document 104 shown in FIG. 1 with a first image region 602 and a second image region 604 recorded by each of the video cameras 107 and 109, respectively. FIG. 6 illustrates the different corrections required to register the two image regions 602 and 604 rotationally by the angle $\phi_2$ and translationally in the x and y directions. The camera mount adjustments 406, 408, and 410 described above are used to register the image regions 602 and 604 rotationally by the angle $\phi_2$ and translationally in the x-direction.

For example, initially the adjustment screw 408 can be used to minimize the relative angle of rotation $\phi_2$ between the two image regions 602 and 604. Subsequently, the adjustment screw 410 can be used to minimize the translation between the two image regions 602 and 604 in the x-direction by moving the second image region relative to the first image region as indicated by arrow 606. Finally, the adjustment screw 406 can be used to define the region of overlap between the two image regions 602 and 604 as indicated by arrow 608.

In accordance with the invention, the adjustment screw 406 is not used to minimize the offset between the image regions in the y-direction. Instead, the adjustment screw 406 in combination with the adjustment knob 306 is used to define the maximum field of view 308 and the maximum document thickness 310 illustrated in FIG. 3. Advantageously, the scanning system 100 is adapted to record hardcopy documents having variable thickness by registering in the y-direction images recording the two image regions 602 and 604.

After registering the two image regions 602 and 604 rotationally by the angle $\phi_2$ and in the x-direction, an overlapping region between the bottom of the second image region 604 and the top of the first image region 602 remains to be registered. For example, FIG. 7 illustrates the two image segments 502 and 504 after they are registered rotationally by the angle $\phi_1$ and translationally in the x-direction but not translationally in the y-direction. To register the image segments 502 and 504 translationally in the y-direction they are processed by the frame merger module 218 as described in detail below.

B.2 Frame Merger Module

A composite image is formed from multiple images by stitching the multiple video images together at a boundary where the multiple images overlap. Exactly where the location of the boundary exists between the overlapping images is variable and depends on the thickness of the bound document 104. More specifically as illustrated in FIG. 3, the region of overlap 312 between recorded images is proportional to the thickness in the z-direction of the hardcopy document 104. Advantageously, the frame merger module 218 is adapted to stitch together images having varying degrees of overlap.

In operation, the frame merger module 218 identifies the region of overlap 312 between two images by computing the one-dimensional correlation of high gradient features between different regions of overlap. The correlation value of high gradient features is used by the frame merger module 218 to identify the degree of similarity between overlapping pixels in each of the regions of overlap and thereby identify the boundary between the overlapping images.

Figure 8:
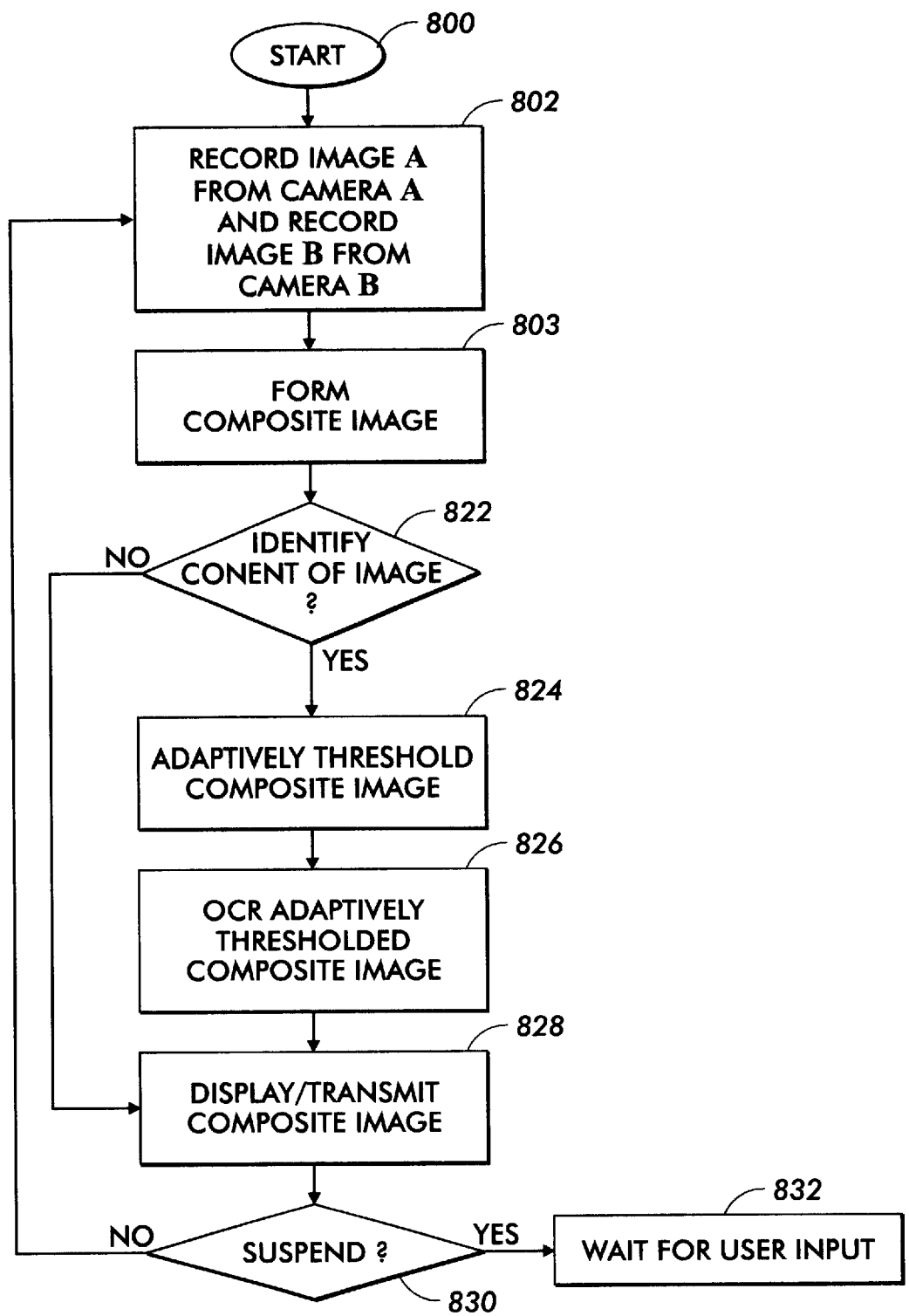
FIGS. 8 and 9 illustrate a flow diagram of the steps performed by the document scanning apparatus to register the two images translationally in the y-direction.
Figure 9:
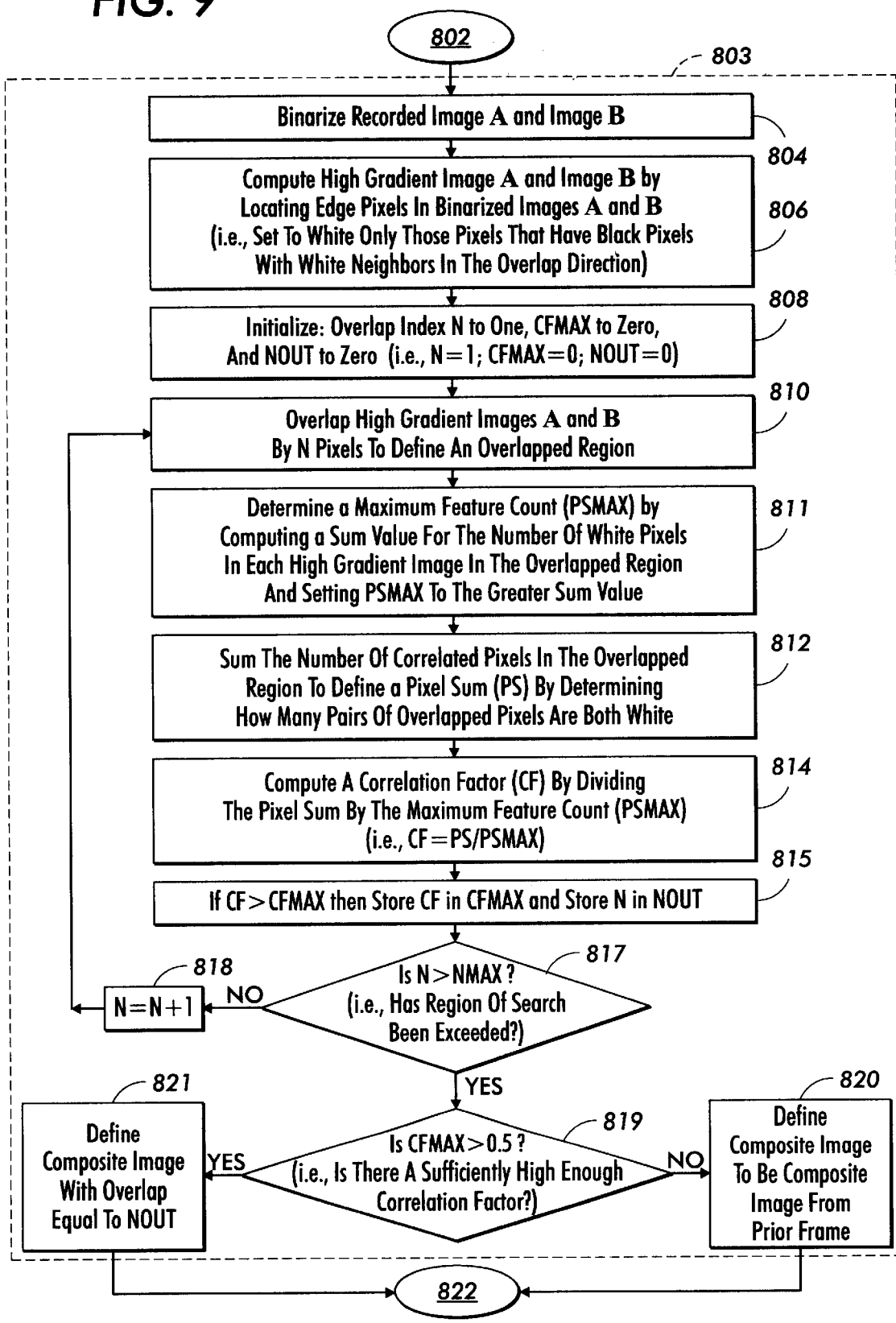

FIG. 8 illustrates a flow diagram of the steps performed by the frame merger module 218 for forming a composite image from two simultaneously recorded images. At step 800, the elements of the arrangement 100 (i.e., computer 100, display 112, and cameras 107 and 109) are turned on and initialized for scanning the hardcopy document 104. At step 802, a first image or frame A is recorded from camera A (e.g., camera 107) and a second image or frame B is recorded from camera B (e.g., camera 109). Once the two images A and B are recorded in the memory 208 of the computer 110, the frame merger module 218 is invoked at step 803 to form a composite image. FIG. 9 illustrates the steps for performing step 803 shown in FIG. 8.

At step 804, which is shown in FIG. 9, the recorded images A and B are binarized. The images A and B are binarized by thresholding the pixels in the images to one of two values (e.g., black/white; 0/1). At step 806, high gradient images A and B are computed for the binarized images A and B, respectively. A high gradient image is computed by locating the edge pixels in the overlap direction (i.e., y-direction) of binarized images A and B. That is, a high gradient image is computed by setting to white only those pixels that have black pixels with white neighbors in the overlap direction (i.e., y-direction). For example, FIGS. 10 and 11 illustrate high gradient image segments for the image segments 504 and 502 respectively, which are illustrated in FIG. 7.

At step 808, selected variables for forming a composite image are initialized. These variables include an overlap index N, which is initialized to one, a maximum correlation factor (CFMAX), which is initialized to zero, and an overlap value (NOUT) for a maximum correlation factor (CFMAX), which is initialized to zero. The overlap index N is used to increment the region of overlap between the high gradient images A and B after completing an iteration of the steps 810, 811, 812, 814, 815, 817 and 818. The variable NOUT records the value of the overlap index N at which the maximum correlation factor (CFMAX) is achieved for a particular region of overlap between the images A and B.

At step 810, the high gradient images A and B are overlapped by the number of rows of pixels defined by the value of the overlap index N initialized at step 808 to define a region of overlap between each of the high gradient images A and B. Subsequently at step 811, a maximum feature count (PSMAX) is determined by first computing a sum value for each high gradient image. The sum value for each high gradient image is computed by summing the number of white pixels in the region of overlap between the high gradient images. Subsequently, once each sum value is computed, the value of PSMAX is set equal to the greater of the sum values (i.e., the image having the greater number of white pixels in the region of overlap).

At step 812, the number of correlated pixels in the region of overlap is summed to define a pixel sum (PS). A pixel is a correlated pixel at step 812 when two overlapping pixels in the regions of overlap of the high gradient images A and B are both white. At step 814, a correlation factor (CF) is computed by dividing the pixel sum (PS), computed at step 812, by the value of the maximum feature count (PSMAX), computed at step 811. This computation is efficient because the correlation is a binary AND operation that changes depending on the number of rows of overlapping pixels in the overlap region, which is in part defined by the overlap index N. At step 815, if the correlation factor (CF) computed at step 814 is greater than the current value of the maximum correlation factor (CFMAX) then the current value of the correlation factor (CF) is stored in CFMAX and the current value of the overlap index N is stored in NOUT.

At step 817, if the overlap index N is greater than a maximum overlap index (NMAX) then step 819 is performed; otherwise, the pixel overlap N is incremented by one at step 818 and steps 810, 811, 812, 814, 815. and 817 are repeated. At step 819, a predetermined threshold value of 0.5, which is determined empirically, is compared to the maximum correlation factor (CFMAX). If the maximum correlation factor (CFMAX) is greater than the threshold 0.5 at step 819, then step 821 is performed; otherwise, step 820 is performed. At step 821, a composite image is defined by setting the overlap of the two images A and B to equal the variable NOUT, which records the overlap index at which the correlation factor is a maximum. A composite image is defined by generating a single image having dimensions in the x-direction equal to the images A and B and in the y-direction equal to the dimensions of the images A and B minus the number of pixels defining the overlap index N (i.e., eliminating the region of overlap in one of the images A and B).

At step 820, the overlap index NOUT determined from a prior frame of images is used to define the composite image. That is, if the correlation factor does not increase above the predetermined threshold value of 0.5 between iterations then no correlated pixels are said to exist in the overlap regions of the images A and B. The distance 314 shown in FIG. 3 defines the maximum overlap region that can exist between the high gradient images A and B. This distance is maximized when the adjustment screw 304 is used to maximize the distance between the cameras 107 and 109 and the surface 102. After completing steps 820 or 821, step 822 is performed.

Referring again to FIG. 8, if at step 822 the content of the composite image requires further processing, then steps 824 and 826 are performed; otherwise, the composite image is displayed or transmitted for display at step 828. An example of a composite image generated after performing step 818 is illustrated in FIG. 12. Whether the content of a composite image requires further processing at step 822 is a user definable setting at a user interface of the computer 110. At step 824, the image enhancement module 222 adaptively thresholds the composite image defined at step 818. Details of a method for adaptively thresholding the composite image is disclosed by Taylor et al. in U.S. patent application Ser. No. 09/081,259, now U.S. Pat. No. 6,072,907 entitled "Method and Apparatus For Enhancing And Thresholding Images," which is hereby incorporated by reference. FIG. 13 illustrates an example of the composite image in FIG. 12 after being adaptively thresholded.

At step 826, the adaptively thresholded image defined at step 824 is analyzed using OCR (Optical Character Recognition) techniques to identify textual and other formatting content, which is subsequently displayed or transmitted at step 828. One advantage for performing step 826 is to improve legibility of the composite image formed at step 803. An example of an application that is adapted to convert the thresholded composite image into a simple ASCII text document or a formatted document with tables and pictures is TextBridge® (which is sold by ScanSoft, Inc.). FIG. 14 illustrates the appearance of the adaptively thresholded composite image shown in FIG. 13 after having been analyzed using OCR techniques. In an alternate embodiment, step 826 is performed after step 832 to minimize the processing performed when a composite image is prepared for display or transmission at step 828.

Finally at step 830, if a determination is made to suspend the continuous generation and display or transmission of composite images then step 832 is performed; otherwise, step 800 is repeated. For example if step 832 is performed, the user may want to suspend processing in order to edit the composite image by cutting and pasting elements from it to another document. Textual content can be cut from the image identified at step 826 and pasted in other electronic documents. Alternatively, the textual content can be cut directly from the composite image defined at step 818 using techniques described by Taylor et al., in U.S. patent application Ser. No. 09/081,266 now U.S. Pat. No. 6,178,270 entitled "Method and Apparatus for Selecting Text And Image Data From Video Images," which is hereby incorporated by reference.

C. Detailed Example

Figure 15:
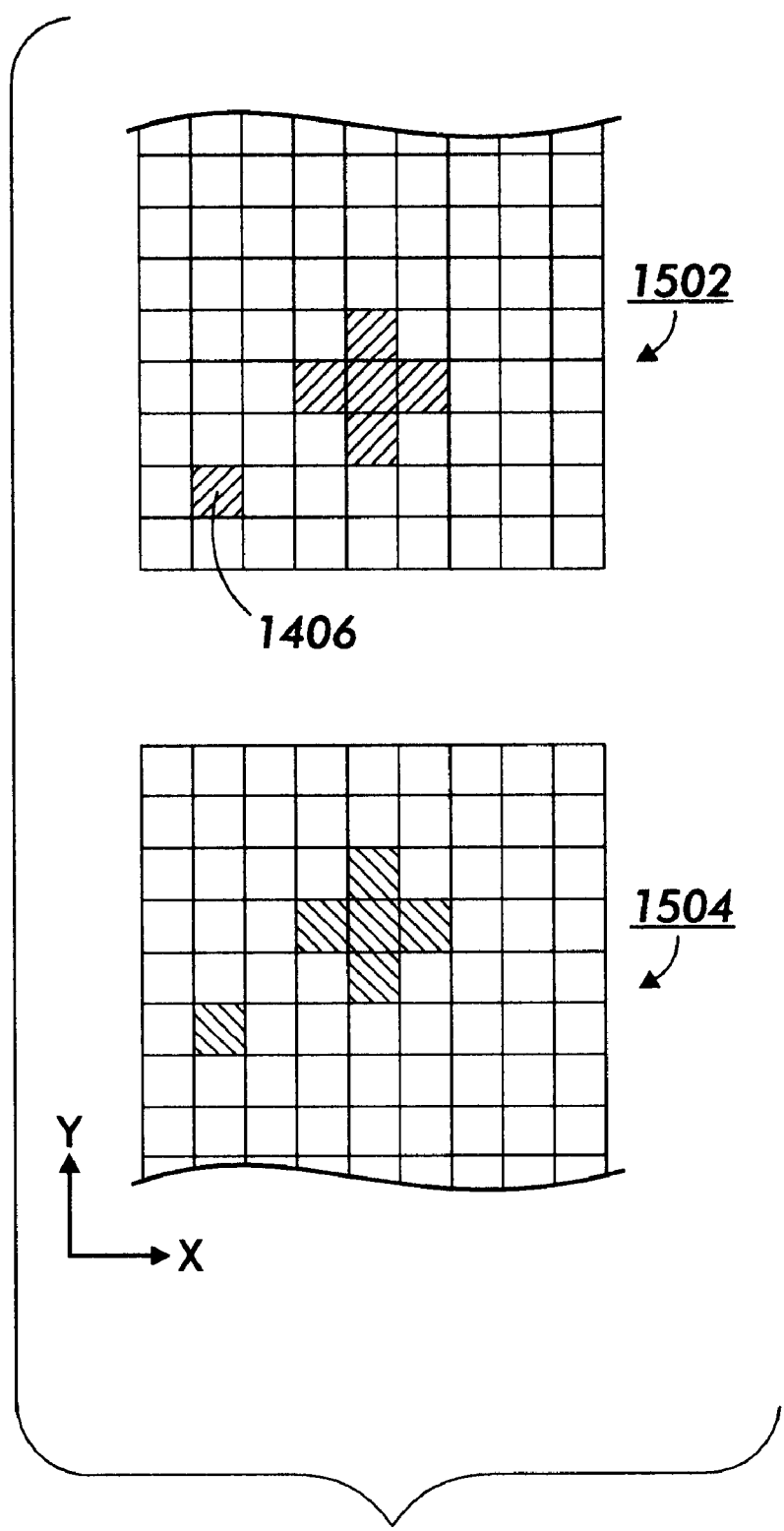
FIGS. 15–24 illustrate a detailed example of the steps performed in FIG. 9 for generating a composite image of two recorded images that overlap a portion of a hardcopy document.

FIGS. 15–24 illustrate a detailed example of the steps set forth in FIG. 9 for generating a composite image of two recorded images that overlap a portion of a hardcopy document. FIG. 15 illustrates an example of a segment of recorded images A and B, which are identified as reference numbers 1502 and 1504 and recorded by cameras 107 and 109, respectively. The squares in each image represent pixel values after each image has been binarized at step 804 in FIG. 9. The two image segments 1502 and 1504 shown in FIG. 15 have six black pixels each, and the remaining pixels in each image are white pixels.

Figure 16:
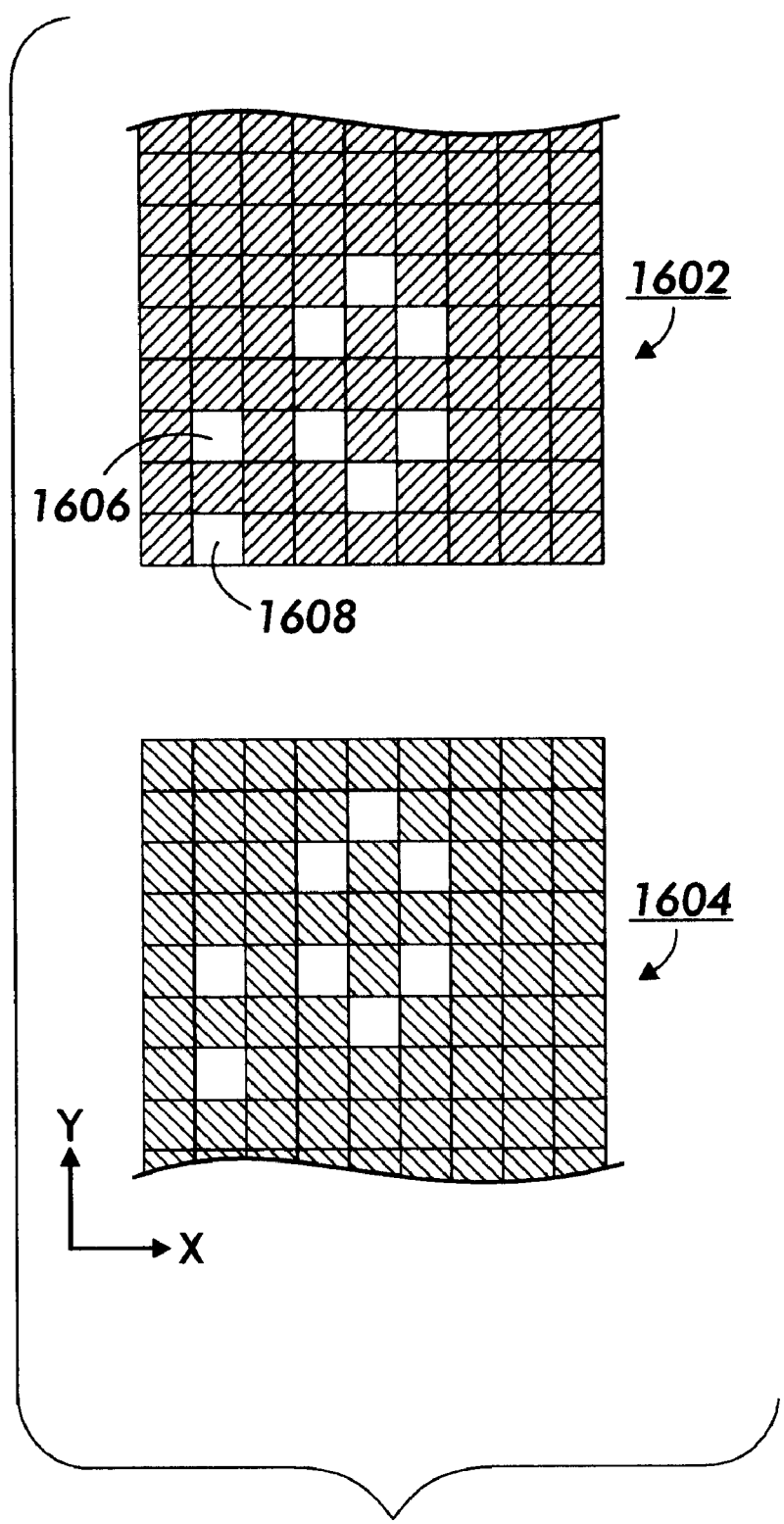

FIG. 16 illustrates the outcome of performing step 806 shown in FIG. 9, which involves generating high gradient images 1602 and 1604 from the binarized image segments 1502 and 1504, respectively, that are shown in FIG. 15. The high gradient images 1602 and 1604 have white pixels where there exists black pixels with neighboring white pixels in the overlap direction (i.e., y-direction) in its corresponding binarized image. For example, the black pixel 1506 in binarized image 1502 in FIG. 15, yields two white pixels 1606 and 1608 in the high gradient image 1602 in FIG. 16.

Figure 17:
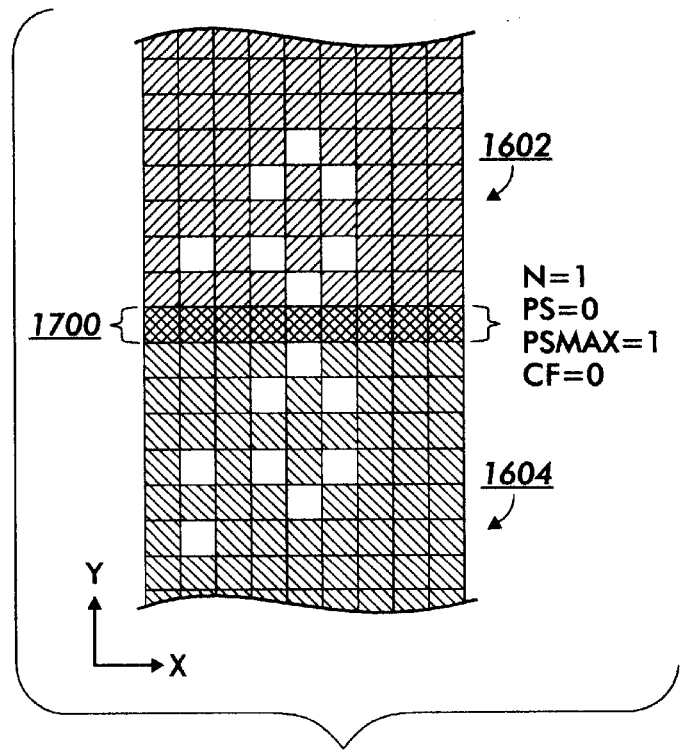
Figure 18:
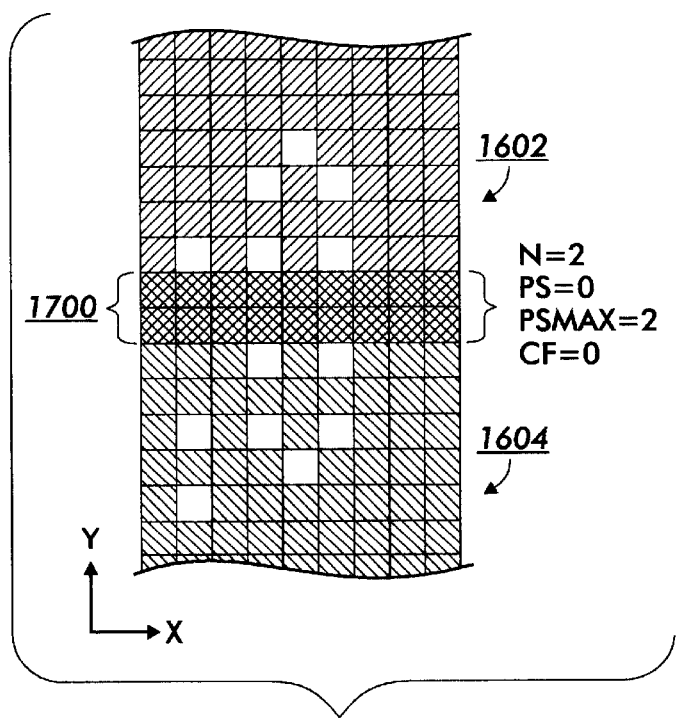
Figure 19:
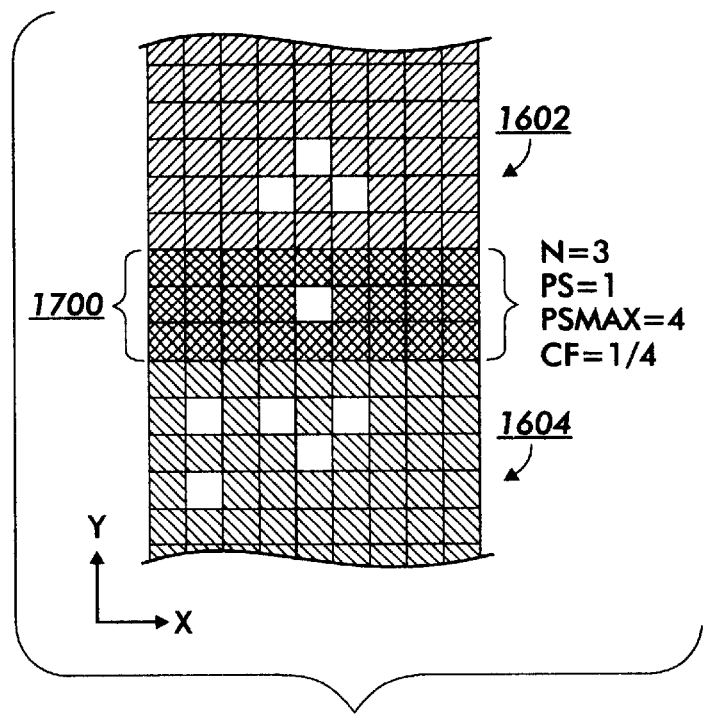
Figure 20:
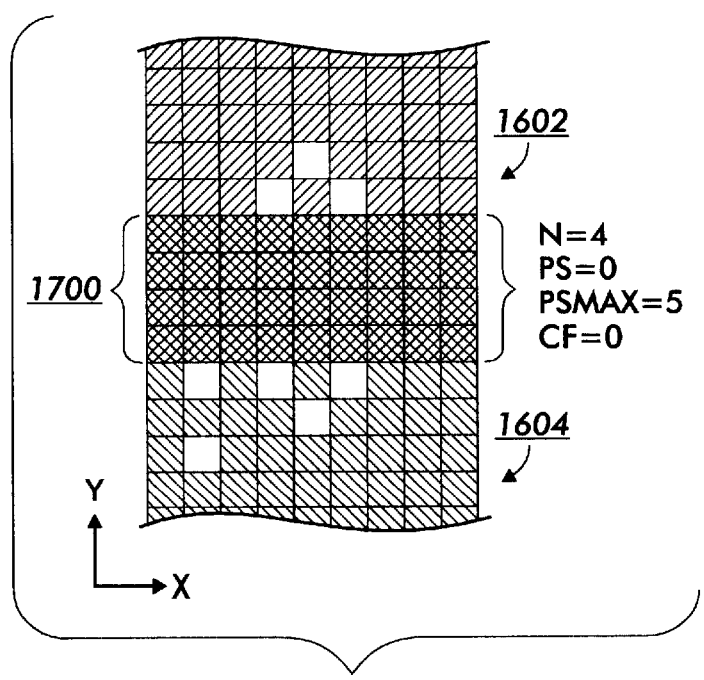
Figure 21:
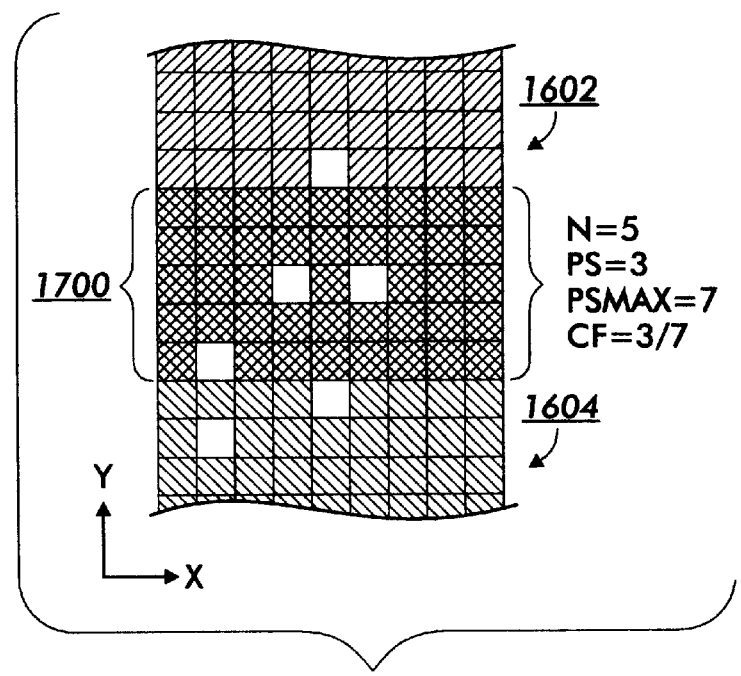
Figure 22:
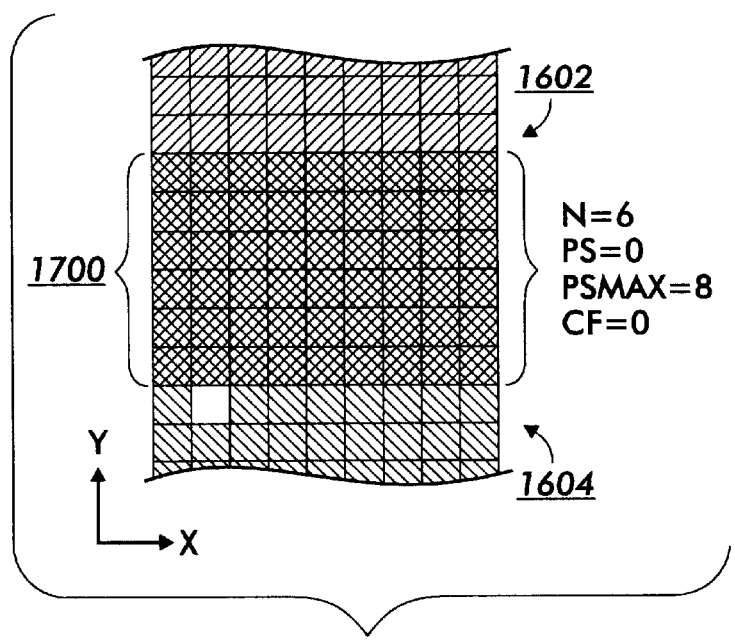
Figure 23:
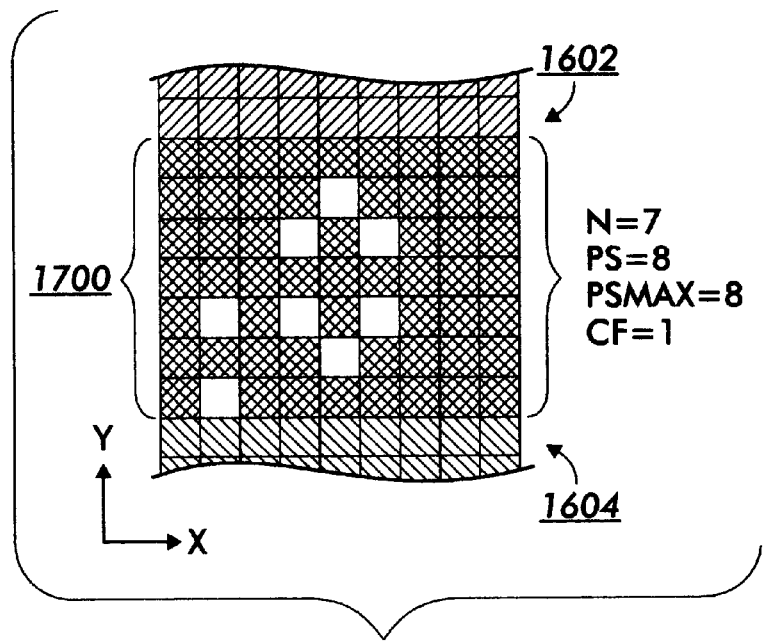
Figure 24:
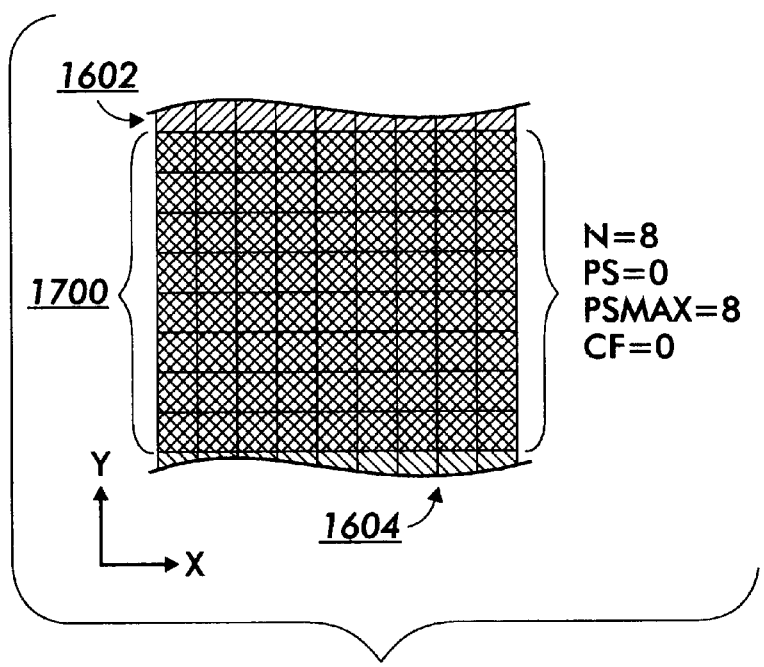

FIGS. 17–24 illustrate the incremental overlapping of the high gradient images 1602 and 1604. The size of the overlapped region defined by the overlap index N in each of these Figures is indicated by the brackets identified by reference number 1700. FIG. 17 illustrates the high gradient images 1602 and 1604 with one row of overlapped pixels. FIGS. 18–24 illustrate the high gradient images 1602 and 1604 in which the value of the overlap index N is successively incremented by one starting at one. No white pixels in the overlapped regions 1700 of the high gradient images 1602 and 1604 shown in FIGS. 17, 18, 20, 22, and 24, exist because no two overlapping pixels in the overlapped regions 1700 were white. The pixel sum (PS) as well as the resulting correlation factor (CF) in these overlapping regions 1700 with no overlapping white pixels is equal to zero. In contrast, FIGS. 19, 21, and 23 illustrate nonzero pixel sums and therefore non-zero correlation factors. Because the overlap region 1700 shown in FIG. 23 has the highest correlation factor of all of the overlapped regions shown in FIGS. 17–22 and 24, the overlap region 1700 shown in FIG. 23 defines NOUT or the pixel overlap that is used to define a composite image for the recorded images A and B.

D. Summary

It will be appreciated by those skilled in the art that although the forgoing description concerned the recording and stitching of two low resolution images, the present invention can be used to form a composite image of an array of low resolution images greater than two. It will further be appreciated that an array of two or more images stitched together can be recorded by a number of cameras that may not equal the number of low resolution images recorded.

In addition, it will be appreciated that the operations performed by the frame merger module 218 may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A document scanning apparatus, comprising:
   an image acquisition system for simultaneously recording parts of a hardcopy document positioned face-up on a surface; the parts of the hardcopy document being recorded without perspective distortion in a first image and a second image by said image acquisition system; a portion of each of the parts of the hardcopy document recorded in the first image and the second image recording an identical segment of the hardcopy document; and
   a frame merger module for forming a composite image of the hardcopy document by stitching the first image and the second image together at the portions in each image that record the identical segment of the hardcopy document; said frame merger module identifying the portion in the first image and the portion in the second image by computing correlation values of high gradient images of the first image and the second image for different regions of overlap between the first image and the second image.

2. The document scanning apparatus according to claim 1, wherein said frame merger module further comprises:
   means for incrementally overlapping the first image and the second image by a predefined number of pixels to define regions of overlap between the first image and the second image;
   means for computing a correlation value for identifying a degree of similarity between overlapping pixels in each of the regions of overlap; and
   means for identifying a maximum correlation value from the correlation values for each of the regions of overlap computed by said computing means to identify the regions of overlap for forming the composite image.

3. The document scanning apparatus according to claim 2, wherein said identifying means forms the composite image using a region of overlap identified for a previous set of images recorded by said image acquisition system when none of the correlation values for each of the regions of overlap exceeds a predefined maximum value.

4. The document scanning apparatus according to claim 1, wherein said image acquisition system further comprises a first camera for recording the first image and a second camera for recording the second image.

5. The document scanning apparatus according to claim 4, wherein said image acquisition system further comprises an adjustment for aligning opposing sides of the first image with opposing sides of the second image.

6. The document scanning apparatus according to claim 4, wherein said image acquisition system further comprises an adjustment for correcting differences in scale between images recorded with the first camera and images recorded with the second camera.

7. The document scanning apparatus according to claim 4, wherein said image acquisition system further comprises an adjustment for defining a maximum document thickness.

8. The document scanning apparatus according to claim 4, wherein said image acquisition system further comprises an adjustment for rotating the first image relative to the second image.

9. The document scanning apparatus according to claim 1, further comprising a display for viewing the composite image of the hardcopy document.

10. The document scanning apparatus according to claim 1, further comprising an image enhancement module for enhancing the composite image of the hardcopy document output from said frame merger module.

11. The document scanning apparatus according to claim 1, further comprising means for computing a high gradient image for the first image and a high gradient image for the second image,
    wherein the high gradient image for the first image and the high gradient image for the second image are computed with:
       means for binarizing the first image and the second image; and
       means for locating edge pixels by setting to black only those pixels in the binarized first image and the binarized second image with white neighbors in an overlap direction.

12. A method for operating a document scanning apparatus, comprising the steps of:
    simultaneously recording, with an image acquisition system, parts of a hardcopy document positioned face-up on a surface; said recording step recording the parts of the hardcopy document without perspective distortion in a first image and a second image; a portion of each of the parts of the hardcopy document recorded in the first image and the second image recording an identical segment of the hardcopy document; and
    forming, with a frame merger module, a composite image of the hardcopy document by stitching the first image and the second image together at the portions in each image that record the identical segment of the hardcopy document; said forming step identifying the portion in the first image and the portion in the second image by computing correlation values of high gradient images of the first image and the second image for different regions of overlap between the first image and the second image.

13. The method according to claim 12, wherein said stitching step further comprises the steps of:
    incrementally overlapping the first image and the second image by a predefined number of pixels to define regions of overlap between the first image and the second image;
    computing a correlation value for identifying a degree of similarity between overlapping pixels in each of the regions of overlap; and identifying a maximum correlation value from the correlation values for each of the regions of overlap computed by said computing step to identify the regions of overlap for forming the composite image.

14. The method according to claim 13, said identifying step forms the composite image using a region of overlap identified for a previous set of images recorded by said recording step when none of the correlation values for each of the regions of overlap exceeds a predefined maximum value.

15. The method according to claim 12, wherein said recording step further comprises the step of recording the first image with a first camera and the second image with a second camera.

16. The method according to claim 15, wherein said recording step further comprises the step of aligning two sides of the first image and two sides of the second image.

17. The method according to claim 15, wherein said recording step further comprises the step of correcting differences in scale between images recorded with the first camera and images recorded with the second camera.

18. The method according to claim 15, wherein said recording step further comprises the step of defining adjusting the height of the document acquisition system relative to the surface on which the hardcopy document is positioned to define a maximum document thickness.

19. The method according to claim 15, wherein said recording step further comprises the step of rotating the first image relative to the second image.

20. The method according to claim 12, further comprising the step of viewing the composite image of the hardcopy document on a display.

21. The method according to claim 12, further comprising the step of computing a high gradient image for the first image and a high gradient image for the second image;

wherein the high gradient image for the first image and the high gradient image for the second image are computed by:

binarizing the first image and the second image; and locating edge pixels by setting to black only those pixels in the binarized first image and the binarized second image with white neighbors in an overlap direction.

\* \* \* \* \*